July 26, 1949.                W. A. WHITING                2,477,533
                                 PIPE JOINT
                             Filed Oct. 19, 1946

INVENTOR.
William A. Whiting
BY

Mellin & Hanscom
ATTORNEYS

Patented July 26, 1949

2,477,533

UNITED STATES PATENT OFFICE 2,477,533

PIPE JOINT

William A. Whiting, Long Beach, Calif.

Application October 19, 1946, Serial No. 704,433

2 Claims. (Cl. 285—163)

The present invention relates to pipe joints, and especially to joints of the type embodying a gasket for the purpose of preventing leakage between the mating joint members.

As a practical matter, it is difficult to have the mating bell and spigot ends of pipe of such true diameter and roundness as to insure a tight seal in conjunction with an intervening gasket, particularly in pipes of large diameter. The obtaining of truly round and proper diameter pipe ends is an expensive and uncertain operation, the factor of uncertainty being increased in the production of cast concrete pipe. The use of properly dimensioned pipe joint members may still result in an insecure seal when such members are placed in cooperative relation but inadvertently misaligned with respect to one another.

In prior devices, the gasket of a pipe joint is subject to a rolling action as a result of assembling the joint, introducing the adverse factors of cutting, shearing and pinching of the gasket, which may also result from the action of high pressure fluids flowing through the pipe. Leakage is an immediate or ultimate effect of such adverse factors. Moreover, prior joint combinations have such characteristics as to permit inadvertent removal of the gasket from its carrying member during assembly of the joint.

Accordingly, it is an object of the present invention to provide a gasket joint which compensates for the ordinary variations in roundness and diameters of the mating ends of pipe, particularly of large diameter concrete and steel pipe.

Another object of the invention is to provide a gasket joint which compensates automatically for misalignment of the mating pipe sections.

A further object of the invention is to provide a gasket joint which resists the rolling tendency of the gasket and precludes its consequent cutting, shearing and pinching.

Yet another object of the invention is to provide a gasket joint in which the gasket is prevented from being inadvertently removed during assembly of the joint.

Several forms which the invention may assume are exemplified in the following description and illustrated by way of example in the accompanying drawings, in which.

Figure 1:
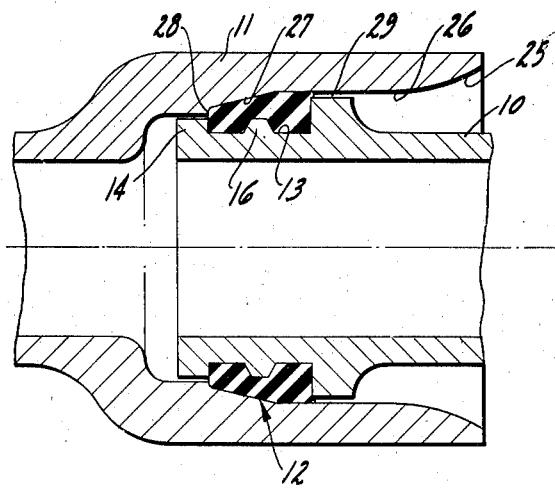
Fig. 1 is a longitudinal section through one form of pipe joint.
Figure 2:
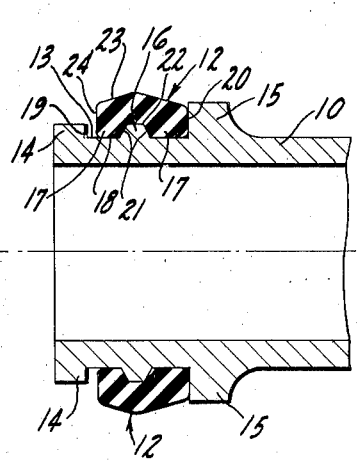
Fig. 2 is a longitudinal section through the spigot or male end of the pipe joint illustrated in Fig. 1, removed from assembled position with respect to its mating bell or female member.

In the form of invention disclosed in Figs. 1 and 2, the spigot or male end 10 of one pipe section is inserted into the enlarged bell or female end 11 of an adjoining pipe section, with a gasket 12 mounted on the spigot for cooperable sealing engagement with the interior of the bell. The spigot 10 has a peripheral groove 13 defined between a pair of annular projections 14, 15 extending outwardly from the normal outside diameter of the spigot, with the forward projection 14 on the end of the spigot having a lesser diameter than the rearward projection 15. An intermediate annular projection 16 may also be provided between the other extending annuli, but this projection or rib 16 may be eliminated, if desired, although its use is advantageous.

The sealing member or gasket ring 12 of rubber or rubber-like material is received within the groove 13 of the spigot. The base of the ring has spaced inwardly extending portions 17 fitting snugly against the base 18 of the groove and adapted to engage the shoulders 19, 20, 21 on the end and intermediate projections 14, 15, 16 upon assembly of the spigot in the bell. The gasket may have a preformed central annular channel 22 into which the intermediate projection 16 fits. It is preferred that the internal diameter of the gasket be slightly less than the diameter of the base 18 of the groove, in order that the gasket may be stretched over the end and intermediate projections 14, 16 on the spigot for the purpose of inherently contracting and snugly engaging the base 18 and shoulders 19, 20, 21.

The gasket has outer tapered peripheral faces 23 converging from its ends in an outward direction toward its central plane. Such tapered faces intersect or merge on a circle having a greater diameter than the outside diameter of the rearward projection 15, with the end face 24 of the gasket projecting substantially above the forward projection 14 on the spigot.

The spigot 10 and gasket 12 mounted thereon are adapted to fit within and seal off against the bell or female portion 11 of the adjacent pipe section. This bell has an entering tapered guiding face 25 diverging toward its free end, and merging into a generally cylindrical guide surface 26 of larger internal diameter than the outside diameter of the rearward projection 15. The inner end of the cylindrical surface merges into a tapered or frusto-conoidal wedge face 27 converging inwardly toward the axis of the pipe, and providing a sealing surface for the gasket 12. The small diameter end of this tapered sealing surface 27 terminates in an internal shoulder 28 formed in the bell, whose internal diameter is greater than the outside diameter of the forward spigot projection 14 and shoulder 19.

In assembling the joint, the spigot 10 with the gasket 12 mounted in its groove 13 is moved into the bell portion 11 of the adjoining pipe section. The tapered surface 25 on the end of the bell guides the spigot into approximate coaxial relation with respect to the bell and also compresses the gasket 12 inwardly to a slight extent. From the tapered guide surface, the gasket moves along the cylindrical guide surface 26 and then is wedged against the tapered sealing surface 27 with the forward face 24 of the gasket abutting the internal shoulder 28 on the bell, which precludes further inward movement of the gasket. When in this position, the sealing surface 27 is opposite the spigot groove 13.

In view of the fact that the inward movement of the spigot 10 compresses the gasket 12 along and against the tapered wedge face 27 of the bell, which is inclined at a comparatively flat acute angle, a tight seal is formed between the gasket 12 and bell 11. The wedging force is predominantly inward, compressing the gasket to hold its base 17 firmly against the base of the ring groove 18 and the central rib 16, its rear face snugly against the rearward spigot shoulder 20 and its forward face against the shoulder 19.

The annular clearance space 29 between the periphery of the rear projection 15 and the cylindrical surface 26 of the bell is sufficient to permit some lateral movement of the spigot with respect to the bell, but is not sufficiently great to allow substantial flowing or displacement of the gasket material thereinto, which might result in pinching off of the outer portion of the gasket and its inability to function as sealing material. The rear projection 15 has a diameter only slightly less than the larger diameter of the tapered wedge sealing face 27 of the bell, which provides a direct transmission of end or axial thrust from the spigot shoulder 20 to the tapered face 27, which, as aforestated, results in the urging of the gasket inwardly, to press it more firmly within the spigot groove 13, with its ends firmly abutting the shoulders 19, 20, 21 formed by the longitudinally spaced projections 14, 15, 16.

The forward projection 14, as well as the rib 16, preclude inadvertent removal of the gasket 12 during assembly of the spigot 10 and gasket within the bell 11. Any variation or lateral movement of the spigot with respect to the bell cannot effect a sliding off of the gasket from the spigot as the joint is being assembled since the gasket is confined between the shoulders 19, 20, 21.

The compressive force between the tapered sealing face 27 of the bell and gasket 12 is predominantly inward, because of the acute angle at which the bell face is arranged with respect to the axis of the pipe. Such inward force resists rolling of the gasket during assembly and prevents its cutting, shearing and pinching on the rear projection 15. The gasket has sufficient lateral thickness to afford a proper seal with the bell despite misalignment of the spigot 10 and bell 11 during assembly, automatically compensating for variations in roundness and diameter of the bell and spigot ends of the pipe. The predominantly lateral transmission of the sealing force between the tapered wedge face 27 and the gasket 12 can deform the gasket radially to fill the full distance between the base 18 of the spigot groove 13 and the tapered face on the bell.

The provision of a gasket assembly, in which the gasket has a wide base and in which the sealing action takes place against an acute angle wedge face 27, which is relatively flat, permits the use of bells having a smaller diameter than would otherwise be necessary. The wide base of the gasket also contributes to its stability during assembly and to the lack of rolling tendency referred to above.

Figure 3:
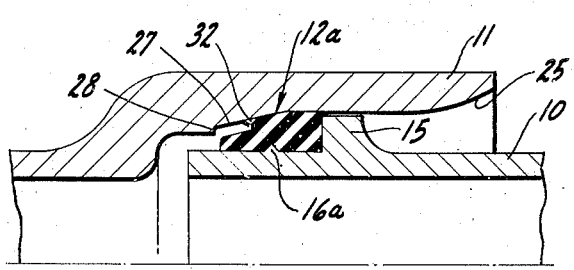
Fig. 3 is a view similar to Fig. 1 of a modified form of the invention.
Figure 4:
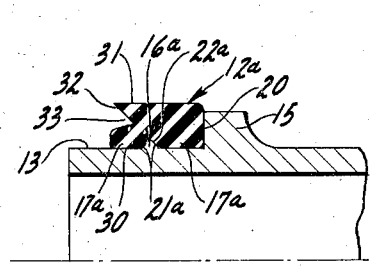
Fig. 4 is a view similar to Fig. 2 of the male portion of the joint disclosed in Fig. 3.
Figure 5:
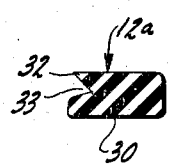
Fig. 5 is a view of the gasket employed in the joint shown in Figs. 3 and 4.

In the embodiment of invention disclosed in Figs. 3, 4 and 5, the same general shape of bell 11 is used and also the same general shape of spigot projections 15, 16a, groove 13 and shoulders 20, 21a. However, the forward projection 14 may be omitted and the gasket 12a has a different form, being in the nature of an annulus or sleeve fitting snugly within the groove 13, whose intermediate projection 16a presses into the originally uniform inner surface 30 of the gasket to form its own annular channel 22a therein. The gasket channel need not necessarily be preformed, as in the other embodiment of the invention. The gasket has a substantially cylindrical outer surface 31 which terminates in a peripheral lip 32 extending toward the forward portion of the spigot, to define an end gasket groove 33 with the base 17a of the gasket.

When placed in assembled position within the bell, the gasket 12a is compressed inwardly in the same manner as in the other embodiment, with the wedging force between the bell 11 and gasket being predominantly inward in a radial direction, and with very little of such force being directed longitudinally or axially, so as to tend to shear, pinch or cut the gasket against the rear abutting projection 15 or shoulder 20. The lip seal 32 engages the tapered wedge face 27 and is subject to the action of the pressure of the fluid flowing through the pipe, which acts on the lip and urges it outwardly into firm sealing engagement with the sealing face 27 of the bell, precluding leakage between the bell and gasket. At the same time, the fluid pressure is acting downwardly on the end 17a of the gasket adjacent the forward portion of the spigot to urge it more firmly against the base 18 of the groove. In this manner, inaccuracies in manufacture, resulting in lack of roundness and variations in diameter of the bell and spigot ends of the pipe, are compensated for.

The embodiment of invention disclosed in Figs. 3, 4 and 5 functions essentially the same as the first-mentioned embodiment and has essentially the same attributes.

While I have shown preferred forms of my invention, it is to be understood that various changes may be made in their construction by those skilled in the art without departing from the spirit of the invention as defined in the appended claims.

Having thus described my invention, what I claim and desire to secure by Letters Patent is:

1. A pipe joint, including cooperable male and female pipe members, said male member having longitudinally spaced forward and rearward shoulders defining a circumferential groove having a base between said shoulders, said rearward shoulder projecting outwardly a greater distance than said forward shoulder, a rib projecting outwardly from said base between said shoulders, said female member having an internal tapered surface opposite said groove converging in a direction toward said forward shoulder and terminating in an internal shoulder at the smaller diameter end of said tapered surface, and a sealing member in said groove disposed over said rib and engaging said tapered surface, said sealing member being compressed between said surface, rearward shoulder and rib.

2. A pipe joint, including cooperable male and female pipe members, said male member having longitudinally spaced forward and rearward shoulders defining a circumferential groove having a base between said shoulders, said rearward shoulder projecting outwardly a greater distance than said forward shoulder, said female member having an internal tapered surface opposite said groove converging in a direction toward said forward shoulder, a sealing member in said groove engaging said tapered surface, said sealing member being compressed between said surface, rearward shoulder and base of said groove.

WILLIAM A. WHITING.

REFERENCES CITED

The following references are of record in the file of this patent:

UNITED STATES PATENTS

| Number | Name | Date |
| --- | --- | --- |
| 2,229,587 | Parker | Jan. 21, 1941 |
| 2,272,811 | Nathan | Feb. 10, 1942 |

FOREIGN PATENTS

| Number | Country | Date |
| --- | --- | --- |
| 377,897 | Italy | Sept. 15, 1938 |